3,453,728
CUTTER HEAD FOR DRY SHAVING APPARATUS
Aldo Loner, 55 Koschatstrasse, Klagenfurt,
Carinthia, Austria
Filed July 13, 1967, Ser. No. 653,106
Claims priority, application Austria, July 15, 1966,
A 6,838/66
Int. Cl. B26b *19/04*
U.S. Cl. 30—34.1                                  1 Claim

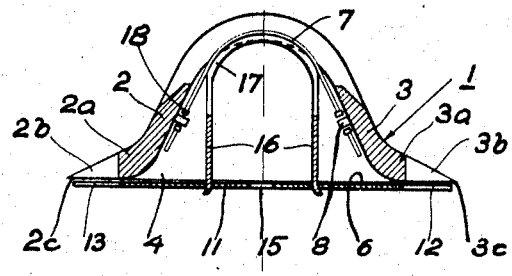
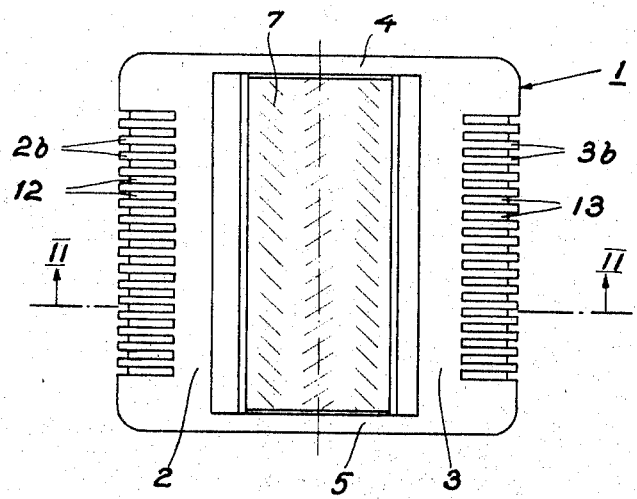
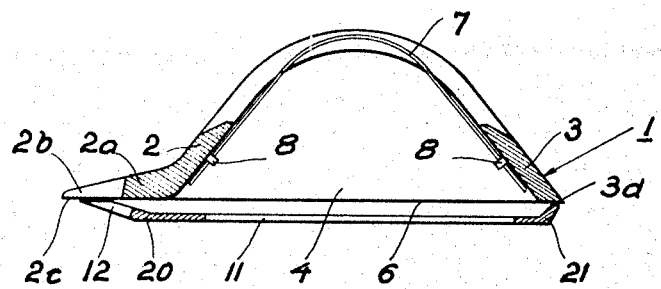

ABSTRACT OF THE DISCLOSURE

A cutter head for dry shaving apparatus having a cutter head frame with two longitudinal bars and means defining a base plane, the bars having a cutter foil fixed thereto. A movable lower cutter is in silding engagement with the cutter foil and a lateral trimmer is formed by an upper cutter with one of the bars. Also a second movable lower cutter is in sliding engagement with the lower cutting surface.

---

The invention relates to a cutter head for dry shaving apparatus, in which a bowed perforated cutter foil, cooperating with a driven lower cutter, is fixed to longitudinal bars of a cutter head frame, and which includes at least one open lateral trimmer, the stationary upper cutter of which likewise cooperates with a driven lower cutter, while the upper cutter for the lateral trimmer is made unitary with one longitudinal bar of the cutter head frame and projects laterally from the lower edge of the latter in the form of a cutter strip carrying cutter teeth at its free edge, against which the associated lower cutter is guided.

In a cutter head of this kind which is known from British patent specification No. 653,508, the cutter surfaces of the upper cutters of the two lateral trimmers together enclose an obtuse angle, and correspondingly the cooperating cutter surfaces on the lower cutter must also lie at an obtuse angle to one another.

Since the manufacture of the cutter head frames takes place in a continuous stamping and pressing operation, finishing of the cutter surfaces is in any event necessary. This finishing is, however, very troublesome, if the cutter surfaces run at an inclination with reference to the flat-surfaced parts of the cutter head frame, because then the correct position of the cutter head frame during grinding must be first ensured by special fastening and adjusting means. This is true likewise for the lower cutter and leads to a particularly troublesome manufacturing operation, if, with the use of two lateral trimmers the cutting surfaces of the latter must be ground at different angles inclined in opposite directions.

According to the present invention these disadvantages are avoided in a cutter head of the kind set out in the introduction, by arranging that the downwardly facing cutting surface or surfaces of the cutter strip or strips, cooperating with the lower cutter, extend parallel to a base plane of the cutter head frame, advantageously in that plane itself.

This leads to the result that the cutter head frame, during grinding of the cutter strips for the lateral trimmers, need only be moved parallel to its base plane in relation to a flat grinding tool.

In the same way the associated lower cutter can likewise be ground by a simple grinding operation, and this ensures that the cooperating cutting surfaces lie fully against one another.

In a cutter head, in which laterally projecting cutter strips are provided on both longitudinal bars of the cutter head frame, so as to form upper cutters for two lateral trimmers, the cutting surfaces of both cutter strips lie in a common plane. If the cutting surfaces of the cutter strip or strips according to the preferred form of construction of the invention lie in the base plane itself of the cutter head frame, the cutter head can be placed directly with this base plane on the flat grinding tool.

In a cutter head with only one lateral trimmer, the longitudinal bar of the cutter head frame lying opposite to the cutter strip can form an abutment surface for a member which is unitary with the lower cutter. Advantageously the abutment surface lies in a common plane with the cutting surface of the cutter strip.

The invention will be described in more detail below with reference to the drawing which shows two constructional examples.

FIGURE 1 shows a plan of one cutter head according to the invention;

FIGURE 2 is a section on the line II—II in FIGURE 1; and

FIGURE 3 shows a section through a second constructional example of the invention.

In all the figures of the drawing only the parts of the cutter head which are significant for the invention are shown.

FIGURES 1 and 2 show a cutter head, the metal cutter head frame 1 of which includes two longitudinal bars 2 and 3, which are connected together at their ends by transverse parts 4 and 5. To the longitudinal bars 2 and 3 there is fixed a perforated cutter foil 7 which is bowed concave with reference to the base plane 6 of the cutter head. In this example, it is engaged, by means of openings provided in its longitudinal edges, with pins 8 which are provided on the inner faces of the longitudinal bars 2 and 3.

In the cutter head construction according to FIGURES 1 and 2, two lateral trimmers are provided. Each of the longitudinal bars 2 and 3 of the cutter head frame 1 has a laterally projecting cutter strip 2*a* or 3*a* which serves as an upper cutter for a lateral trimmer, in which cutter teeth 2*b* or 3*b* are formed. The cutting surfaces 2*c*, 3*c* of the upper cutters 2*a*, 3*a*, lying on the sides of the cutter teeth 2*b*, 3*b* turned away from the perforated cutter foil 7, extend parallel to the base plane 6 of the cutter head frame 1. The cutter head frame is cut away down to base plane 6 at each side of the longitudinal bars 2, 3 which lies opposite the perforated cutter foil. This measure gives on the one hand the advantage, that the cutting surfaces 2*c*, 3*c* of the upper cutters 2*a*, 3*a*, can easily be machined together, and in particular can be ground, and on the other hand the advantage that the lower cutters can, entirely without obstrucion, be assembled with the associated upper cutters.

With both the upper cutters 2*a*, 3*a* there is associated, in known manner, a common lower cutter 11, which is made plate-shaped, and has rows of teeth 12, 13 on its longitudinal edges. The drive of the lower cutter can, for example, be provided by an oscillatory lever engaging in an opening 15 in the plate.

By way of illustration there is also shown in FIGURE 2 the lower cutter 16 for the perforated cutter foil 7, which has parallel arcuate edges 17. This lower cutter 16 may, as shown, be joined in a unitary assembly with the lower cutter 11 for the lateral trimmers. In this case it is appropriate to make the attachment of the perforated cutter foil 7 to the longitudinal bars 2 and 3 resilient, for example through elastic intermediate parts 18, which are only shown schematically, so that the perforated cutter foil can adapt itself to the position of the lower cutter. Of course the lower cutter 16 can also, as is often the case, be pressed against the perforated cutter foil 7 by separate springs.

FIGURE 3 shows a particularly simple and suitable cutter head construction according to the invention, in which only a single lateral trimmer is present. As compared with the constructional example according to FIGURES 1 and 2, the cutter strip 2a projecting laterally from the longitudinal bar 2, which forms the upper cutter, is so arranged that its cutting surface 2c lies directly in the base plane 6 of the cutter head frame 1. By this means this cutting surface can be produced simply by grinding of the base surface of the cutter head frame. The lower cutter 11 for the lateral trimmer is advantageously again made plate-shaped, and has bent-up portions 20 and 21 on the longitudinal edges, while cutter teeth 12 are formed in the portion 20 lying on the side of the lateral trimmer upper cutter 2a. The bent-up parts 20 and 21 are ground flat at their ends. The part 20 engages with its teeth 12 against the upper cutter 2a, while the part 21 without teeth engages against an abutment surface 3d on the other longitudinal bar 3, which lies in the same plane as the cutting surface 2c. By this means a particularly complete engagement of the lower cutter with the upper cutter is achieved. Of course this construction is also well suited for a cutter head with two open lateral trimmers in which case the longitudinal bar 3 would then also have a toothed projecting part to form an upper cutter, and the part 21 of the lower cutter would be provided with cutting teeth.

I claim:
1. A shaving head for dry shaving apparatus, comprising a skeleton frame including two longitudinal bars, a bowed perforated stationary cutter foil secured to said longitudinal bars, a cutter reciprocating in a direction parallel to said longitudinal bars and cooperating in sliding engagement with the perforated cutter foil, and a lateral long hair clipper adjacent to at least one of the longitudinal bars of the skeleton frame, said clipper having a stationary upper cutter which is formed by a lateral projection of the respective longitudinal bar in the form of a cutter strip carrying cutter teeth at its free edge and having a cutting surface which lies coplanar with a base plane defined by the lower edges of the skeleton frame, and a lower cutter for the clipper also reciprocating in a direction parallel to the longitudinal bars of the skeleton frame and cooperating in sliding engagement with said cutting surface of the upper cutter of the clipper, the reciprocating lower cutter of the clipper being a single clipper arranged adjacent to one longitudinal bar of the skeleton frame and is unitary with a member which is in sliding engagement with an abutment surface on the other longitudinal bar of the skeleton frame, and said lower cutter having a bent-up part cooperating with the abutment surface.

References Cited

UNITED STATES PATENTS

| 2,234,929 | 3/1941 | Lynch | 30—43.9 |
| 2,975,516 | 3/1961 | Heyek | 30—34.1 |
| 3,213,535 | 10/1965 | Heyek | 30—34.1 |
| 3,343,258 | 9/1967 | Loner | 30—34.1 |
| 2,331,466 | 10/1943 | Going | 30—34.1 |
| 2,370,542 | 2/1945 | Jepson | 30—34.1 |
| 3,279,056 | 10/1966 | Andis | 30—34.1 |

FOREIGN PATENTS 228,720  12/1943  Switzerland.

MYRON C. KRUSE, *Primary Examiner.*

U.S. Cl. X.R.

30—346.51